US 9,851,630 B2

(12) United States Patent
Kang et al.

(10) Patent No.: US 9,851,630 B2
(45) Date of Patent: Dec. 26, 2017

(54) FLY-EYE LENS AND OPTICAL ENGINE FOR PROJECTOR INCLUDING SAME

(71) Applicant: LG ELECTRONICS INC., Seoul (KR)

(72) Inventors: Shin Gyu Kang, Seoul (KR); Eun Jin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/102,935

(22) PCT Filed: Dec. 23, 2013

(86) PCT No.: PCT/KR2013/012006
§ 371 (c)(1),
(2) Date: Jun. 9, 2016

(87) PCT Pub. No.: WO2015/088087
PCT Pub. Date: Jun. 18, 2015

(65) Prior Publication Data
US 2016/0357098 A1     Dec. 8, 2016

(30) Foreign Application Priority Data
Dec. 9, 2013   (KR) .................. 10-2013-0152566

(51) Int. Cl.
*G03B 21/20*   (2006.01)
*H04N 9/31*    (2006.01)
(Continued)

(52) U.S. Cl.
CPC ......... *G03B 21/208* (2013.01); *G02B 3/0043* (2013.01); *G02B 3/0056* (2013.01);
(Continued)

(58) Field of Classification Search
CPC .............. G03B 21/208; G03B 21/2013; G03B 21/2033; G03B 21/005; H04N 9/3152;
(Continued)

(56) References Cited

U.S. PATENT DOCUMENTS 5,418,583 A  *  5/1995  Masumoto ........... G02B 3/0031
                                           348/E9.027
2012/0249973 A1*  10/2012  Miura ................ G02B 27/0905
                                           353/38

FOREIGN PATENT DOCUMENTS

EP        1083757 A2     3/2001
KR    10-2001-0105785 A   11/2001
(Continued)

OTHER PUBLICATIONS

International Search Report dated Sep. 4, 2014 issued in Application No. PCT/KR2013/012006.

*Primary Examiner* — Ryan Howard
(74) *Attorney, Agent, or Firm* — KED & Associates, LLP

(57) ABSTRACT

An optical engine for a projector according to an embodiment of the present invention comprises: a first light source unit; a second light source unit which outputs a light with a color which is different from that of the first light source unit; a third light source unit which outputs a light with a color which is different from those of the first and second light source units; a micro display panel which outputs a predetermined image; a fly-eye lens which equalizes lights and includes a plurality of cells, each of which is configured by a convex lens; and a projection lens which projects a generated projection image to the outside on the basis of an output light of the first to third light source units and an output image, wherein two or more cells among a plurality of cells have shapes different from shapes of other cells. Therefore, optical efficiency can be improved while simplifying a structure and a component of the projector so that
(Continued)

manufacturing costs and an installation space can be reduced and display quality can be improved.

12 Claims, 7 Drawing Sheets

(51) Int. Cl.
*G02B 3/00* (2006.01)
*G03B 21/00* (2006.01)

(52) U.S. Cl.
CPC ........ *G03B 21/2033* (2013.01); *G03B 21/005* (2013.01); *H04N 9/3152* (2013.01); *H04N 9/3164* (2013.01)

(58) Field of Classification Search
CPC ... H04N 9/3164; G02B 3/0056; G02B 3/0043
USPC .......................................................... 353/38
See application file for complete search history.

(56) References Cited

FOREIGN PATENT DOCUMENTS

| KR | 10-0900971 B1 | 6/2009 |
|---|---|---|
| KR | 10-2013-0019191 A | 2/2013 |
| KR | 10-2013-0066281 A | 6/2013 |

\* cited by examiner

FLY-EYE LENS AND OPTICAL ENGINE FOR PROJECTOR INCLUDING SAME

CROSS-REFERENCE TO RELATED PATENT APPLICATIONS

This application is a U.S. National Stage Application under 35 U.S.C. §371 of PCT Application No. PCT/KR2013/012006, filed Dec. 23, 2013, which claims priority to Korean Patent Application No. 10-2013-0152566, filed Dec. 9, 2013, whose entire disclosures are hereby incorporated by reference.

TECHNICAL FIELD

The present invention relates to a fly-eye lens and an optical engine for a projector including the same and, more particularly, to a fly-eye lens which may improve optical efficiency while simplifying the structure and components of a projector, and an optical engine for a projector including the same.

BACKGROUND ART

Among display devices, a projector is a device which projects light onto a screen to form an image and is advantageous in that it may easily display a large-scale picture as compared to other display devices.

Conventional projectors using lamps as light sources tend to be gradually converted into eco-friendly and low-cost projectors using light emitting diodes (LEDs) as light sources. Such LED projectors generally have a structure having separate LEDs emitting red, green and blue (RGB) light, differently from lamp projectors having one light source, and a large number of light sources complicates the structure of an optical system and requires many component, i.e., lenses.

Therefore, research on a structure for simplifying the structure and components of a projector having multiple light sources and a method of designing the same are underway.

DISCLOSURE

Technical Problem

Therefore, the present invention has been made in view of the above problems, and it is an object of the present invention to provide a fly-eye lens which may improve optical efficiency while simplifying the structure and components of a projector, and an optical engine for a projector including the same.

Technical Solution

In accordance with an aspect of the present invention, the above and other objects can be accomplished by the provision of an optical engine for a projector, including a first light source unit, a second light source unit configured to output light beams with a color different from that of the first light source unit, a third light source unit configured to output light beams with a color different from those of the first light source unit and the second light source unit, a micro display panel configured to output a predetermined image, a fly-eye lens including a plurality of cells, each of which includes a convex lens, and configured to equalize light beams, and a projection lens configured to project a generated projection image to the outside based on the output light beams from the first to third light source units and the output image, wherein, among the cells, two or more cells have shapes different from shapes of other cells.

In accordance with another aspect of the present invention, there is provided a fly-eye lens including a plurality of cells, each of which includes a convex lens, wherein among the cells, two or more cells have shapes different from shapes of other cells, and at least one of the cells has a parallelogram shape or some of the cells are gathered to form a parallelogram shape.

Advantageous Affects

A fly-eye lens and an optical engine for a projector including the same in accordance with the present invention may improve optical efficiency while simplifying the structure and components of the projector so that manufacturing costs and an installation space may be reduced and display quality may be improved.

BEST MODE

Figure 1:
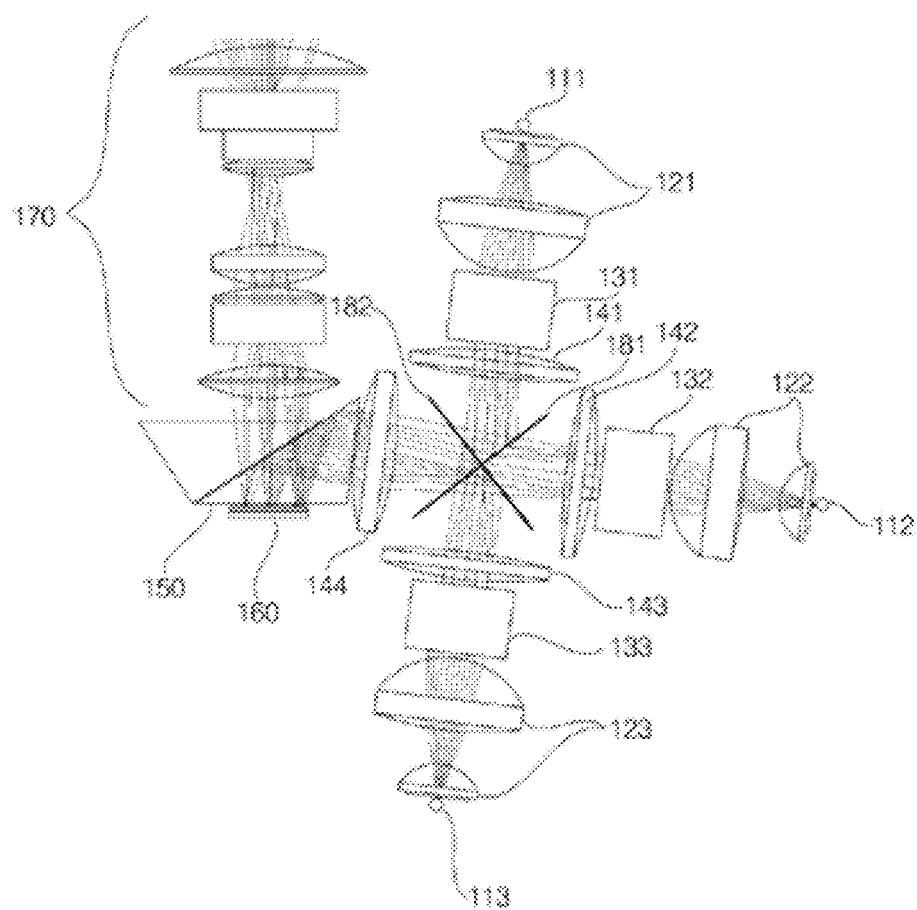
FIG. 1 is a view exemplarily illustrating a conventional optical engine for a projector.

Hereinafter, embodiments of the present invention will be described in detail with reference to the accompanying drawings. While the invention will be described in conjunction with exemplary embodiments, it will be understood that the present description is not intended to limit the invention to the exemplary embodiments.

In the drawings, in order to clearly and briefly describe the invention, parts which are not related to the description will be omitted and, in order to more clearly describe the invention, thicknesses, areas, etc. of elements are enlarged or reduced and thus the thicknesses, areas, etc. of the elements are not limited to the drawings.

In the following description of the embodiments, the terms "including" will be interpreted as indicating the presence of other elements, unless stated otherwise, and do not exclude presence of the corresponding elements.

Now, a projector in accordance with one embodiment of the present invention will be described in detail with reference to the accompanying drawings.

FIG. 1 is a view exemplarily illustrating a conventional optical engine for a projector.

With reference to FIG. 1, a conventional optical engine for a projector includes a Digital Micro mirror Device (DMD) panel 160, one or more LED light sources 111, 112, 113, collimator lenses 121, 122, 123 to convert light beams into parallel light beams, selective wavelength division mirrors 181, 182 using wavelength characteristics of the respective light sources 111, 112, 113, fly-eye lenses 131, 132, 133 or light tunnels to maintain uniform luminosity distribution on the panel 160, relay lenses 141, 142, 143, 144 to collimate light beams to match the size of the panel 160, a Total Internal Reflection (TIR) prism 150 and a mirror to change an angle to match the incidence angle and exit angle of the panel, and a projection lens 170 to enlarge and project exit light beams onto a screen.

A DMD structure which is a kind of micro display requires a specific incidence angle of light and such an angle increases the overall size of an optical system, restricts the structure and design of the optical system and complicates tools and circuit components, thereby producing high-cost optical engine.

Further, common use of a heat sink is impossible, costs and size of the DMD structure are increased by addition of a heat pipe, and a fan has an ineffective configuration.

In order to solve these problems, if a plurality of LEDs is sequentially disposed, LEDs distant from a fly-eye lens (FEL) have lower efficiency than LEDs close to the FEL due to limited performance of a collimator lens and the overall size of an optical system is increased to compensate for such efficiency.

Figure 2:
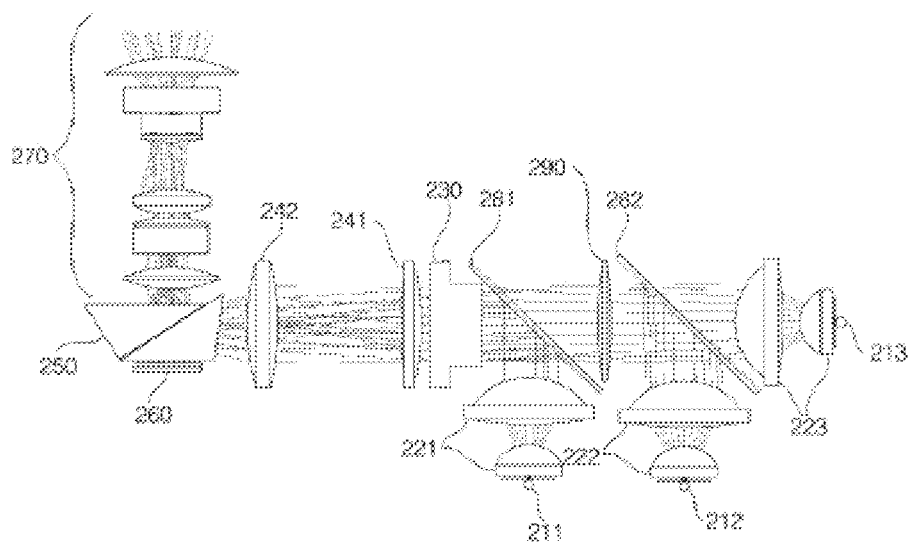
FIGS. 2 and 3 are views illustrating optical engines for a projector in accordance with embodiments of the present invention.

FIG. 2 is a view illustrating an optical engine for a projector in accordance with one embodiment of the present invention.

With reference to FIG. 2, an optical engine in accordance with one embodiment of the present invention includes a first light source unit 211, a second light source unit 212 to output light beams with a color different from that of the first light source unit 211, a third light source unit 213 to output light beams with a color different from those of the first light source unit 211 and the second light source unit 213, a micro display panel 260 to output a predetermined image, a fly-eye lens 230 to equalize light beams, and a projection lens 370 to project a generated projection image to the outside based on the output light beams from the first to third light source units 211, 212, 213 and the output image.

The optical engine in accordance with one embodiment of the present invention includes a plurality of light source units 211, 212, 213 to output light beams with different colors. For example, the first light source unit 211 may include an LED light source to output red light beams, the second light source unit 212 may include an LED light source to output green light beams, and the third light source unit 213 may include an LED light source to output blue light beams.

Although the specification states the micro display panel 260 as one element of the optical engine, the present invention is not limited thereto. For example, the micro display panel 260 may be an element of an independent projector which is not included in the optical engine.

With reference to FIG. 2, the optical engine may further include first to third collimator lenses 221, 222, 223 to convert light beams output from the first to third light source units 211, 212, 213 into parallel light beams, the traveling direction of light having passed through the first collimator lens 221 may be parallel with light having passed through the second collimator lens 222, and the traveling direction of light having passed through the first collimator lens 221 may be perpendicular to light having passed through the third collimator lens 223.

That is, the first light source unit 211 and the second light source unit 212 are disposed in parallel and the third light source unit 213 is disposed so as to output light beams in a direction perpendicular to the first light source unit 211 and the second light source unit 212. Thereby, the first collimator lens 221 and the second collimator lens 222 are disposed in parallel and the third collimator lens 223 is disposed in a direction perpendicular to the first collimator lens 221 and the second collimator lens 222.

In the specification, parallel light beams do not mean only theoretically completely parallel light beams. As known from FIGS. 1 and 2, a plurality of collimator lens may be provided and light beams having passed through a lens adjacent to a light source unit may include light beams having optical paths having directionality in designated directions via other lenses.

With reference to FIG. 2, the optical engine in accordance with one embodiment of the present invention may include a first mirror 281 to change the traveling direction of light beams from the first light source unit 211 and to transmit light beams from the second light source unit 212 and the third light source unit 213, and a second mirror 282 to change the traveling direction of light beams from the second light source unit 212 and to transmit light beams from the third light source unit 213. The first mirror 281 and the second mirror 282 may selectively transmit light beams of a designated wavelength.

Further, the optical engine in accordance with one embodiment of the present invention may further include a common lens 290 disposed between the first mirror 281 and the second mirror 282.

Further, the optical engine in accordance with one embodiment of the present invention may further include relay lenses 241, 242 to collimate light beams having passed through the fly-eye lens 230, and a Total Internal Reflection (TIR) prism 250 to output light beams to the projection lens 270.

Here, the third light source unit 213, the fly-eye lens 230, the relay lenses 241, 242, and the projection lens 270 may be disposed in an 'L' shape.

The projector in accordance with the embodiment of the present invention includes internal components disposed in a right-angle (L-shaped) structure so as to be advantageous in terms of the overall size and configuration of the projector.

With reference to FIG. 2, as the first light source unit 211 and the second light source unit 212 are disposed in parallel, light beams from the second light source unit 212 and the third light source unit 213 have long optical paths. Therefore, light beams from the second light source unit 212 and the third light source unit 213 gradually disperse via long optical paths and thus the loss rate of the light beams to the outside of the fly-eye lens 230 may be increased.

Therefore, the common lens 290 to compensate for the optical paths of the second light source unit 212 and the third light source unit 213 slightly collimates light beams between the first mirror 281 and the second mirror 282 and thus the loss rate of the light beams may be reduced.

In accordance with the present invention, optical efficiency may be improved and heat sinks and components may be simplified, thereby achieving a miniaturized and low-cost projector.

Figure 3:
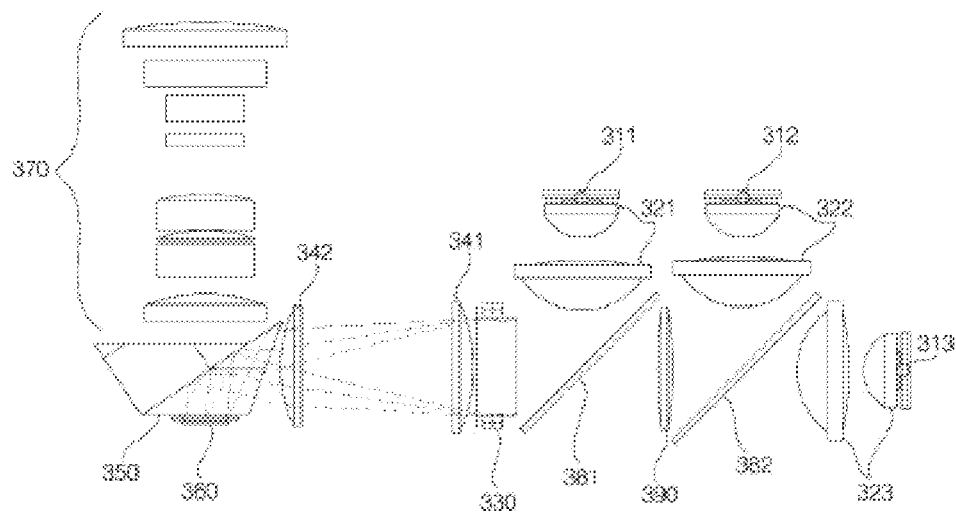

FIG. 3 is a view exemplarily illustrating an optical engine for a projector in accordance with one embodiment of the present invention.

With reference to FIG. 3, an optical engine in accordance with one embodiment of the present invention includes a first light source unit 311, a second light source unit 312 to output light beams with a color different from that of the first light source unit 311, a third light source unit 313 to output light beams with a color different from those of the first light source unit 311 and the second light source unit 213, a micro display panel 360 to output a predetermined image, a fly-eye lens 330 to equalize light beams, and a projection lens 370 to project a generated projection image to the outside based on the output light beams from the first to third light source units 211, 212, 213 and the output image.

The optical engine in accordance with one embodiment of the present invention includes a plurality of light source units 311, 312, 313 to output light beams with different colors. For example, the first light source unit 311 may include an LED light source to output red light beams, the second light source unit 312 may include an LED light source to output green light beams, and the third light source unit 313 may include an LED light source to output blue light beams.

The optical engine in accordance with one embodiment of the present invention may include heat sinks (not shown) located on the rear surfaces of the first light source unit 311 and the second light source unit 312. Further, a fan may be disposed between the projection lens 370 and the heat sinks (not shown).

Further, the optical engine may further include first to third collimator lenses 321, 322, 323 to convert light beams output from the first to third light source units 311, 312, 313 into parallel light beams, the traveling direction of light beams having passed through the first collimator lens 321 may be parallel with light beams having passed through the second collimator lens 322, and the traveling direction of light beams having passed through the first collimator lens 321 may be perpendicular to light beams having passed through the third collimator lens 323.

That is, the first light source unit 311 and the second light source unit 312 are disposed in parallel and the third light source unit 313 is disposed so as to output light beams in a direction perpendicular to the first light source unit 311 and the second light source unit 312. Thereby, the first collimator lens 321 and the second collimator lens 322 may be disposed in parallel and the third collimator lens 323 may be disposed in a direction perpendicular to the first collimator lens 321 and the second collimator lens 322.

With reference to FIG. 3, the optical engine in accordance with one embodiment of the present invention may include a first mirror 381 to change the traveling direction of light beams from the first light source unit 311 and to transmit light beams from the second light source unit 312 and the third light source unit 313, and a second mirror 382 to change the traveling direction of light beams from the second light source unit 312 and to transmit light beams from the third light source unit 313. The first mirror 381 and the second mirror 382 may selectively transmit light beams of a designated wavelength.

Further, the optical engine in accordance with one embodiment of the present invention may further include a common lens 390 disposed between the first mirror 381 and the second mirror 382.

Further, the optical engine for a projector in accordance with one embodiment of the present invention may further include relay lenses 341, 342 to collimate light beams having passed through the fly-eye lens 330, and a Total Internal Reflection (TIR) prism 350 to output light beams to the projection lens 370.

Here, the third light source unit 313, the fly-eye lens 330, the relay lenses 341, 342, and the projection lens 370 may be disposed in an 'L' shape.

A projector in accordance with one embodiment of the present invention may include the heat sinks (not shown) located on the rear surfaces of the first light source unit 311 and the second light source unit 312. Further, a fan may be disposed between the projection lens 370 and the heat sinks (not shown) and thus increase space utilization effects.

Although, for convenience of description, the optical engine for a projector of FIG. 3 including a fly-eye lens in accordance with one embodiment of the present invention will be described hereinafter, the present invention may be applied to the structure exemplarily shown in FIG. 2.

Figure 4:
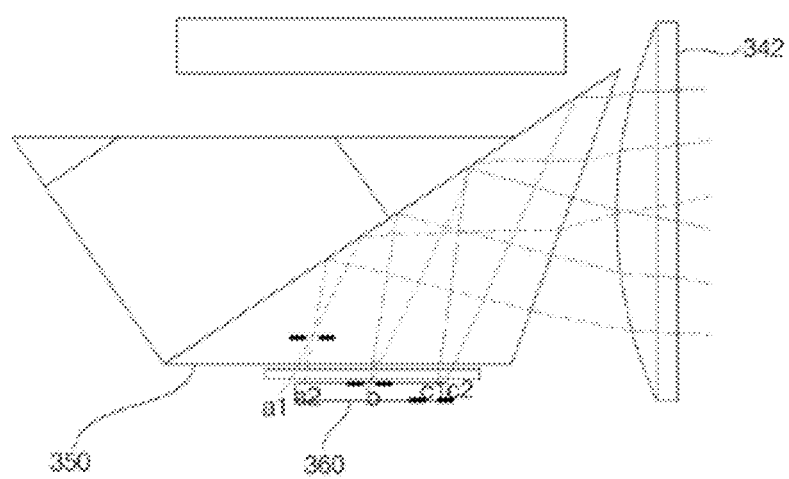
FIG. 4 is a reference view illustrating optical paths if a conventional fly-eye lens is used.
Figure 5:
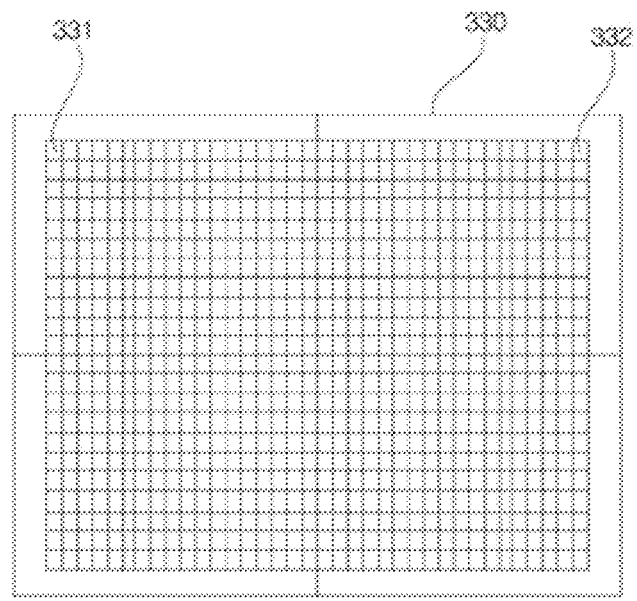
FIG. 5 is a view exemplarily illustrating the shape of the conventional fly-eye lens.

FIG. 4 is a reference view illustrating optical paths if a conventional fly-eye lens is used and FIG. 5 is a view exemplarily illustrating the shape of the conventional fly-eye lens. In more detail, FIG. 4 exemplarily illustrates optical paths if the fly-eye lens having the shape of FIG. 5 is applied to the optical engine exemplarily shown in FIG. 3.

With reference to the drawings, a projector using a general DMD chip uses a TIR prism 350 to match a specific incidence angle of the DMD 360. Such an incidence angle of the DMD 360 may more easily generate aberration and distortion in an optical system below the TIR prism 350.

Further, if the fly-eye lens 330 is used, the shapes of the respective cells of the fly-eye lens 330 incident upon the DMD 360 are distorted and generate optical loss, thereby lowering uniformity of a screen.

The shapes of respective cells 331, 332 of the conventional fly-eye lens 330 are the same and symmetrical. Since a projector using the DMD panel 360 requires a specific incidence angle, an optical incidence path in the optical engine having a right angle structure, as exemplarily shown in FIG. 2 or 3, may vary according to positions of the respective cells 331, 332 of the fly-eye lens 330.

Therefore, as exemplarily shown in FIG. 4, the position of a focus may vary according to positions of the respective cells. In FIG. 4, a mark '·' indicates the positions of the focus according to positions of the respective cells.

Some b of light beams having passed through the relay lens 342 are accurately focused on the focus but some a1, a2, c1, c2 of the light beams may deviate upward or downward from the position of the focus of the DMD panel 360, and thus an image may be distorted or uniformity of the image may be lowered.

Figure 6:
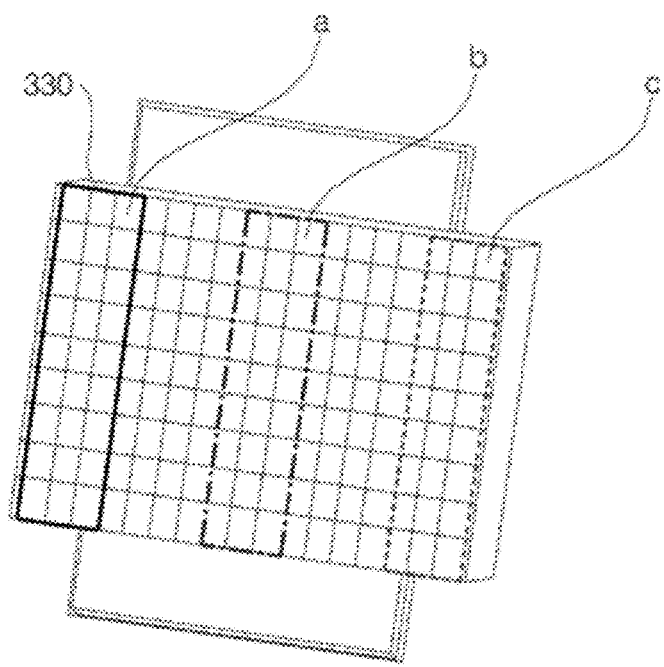
FIGS. 6 and 7 are views illustrating the conventional fly-eye lens and image formation on a DMD panel.
Figure 7:
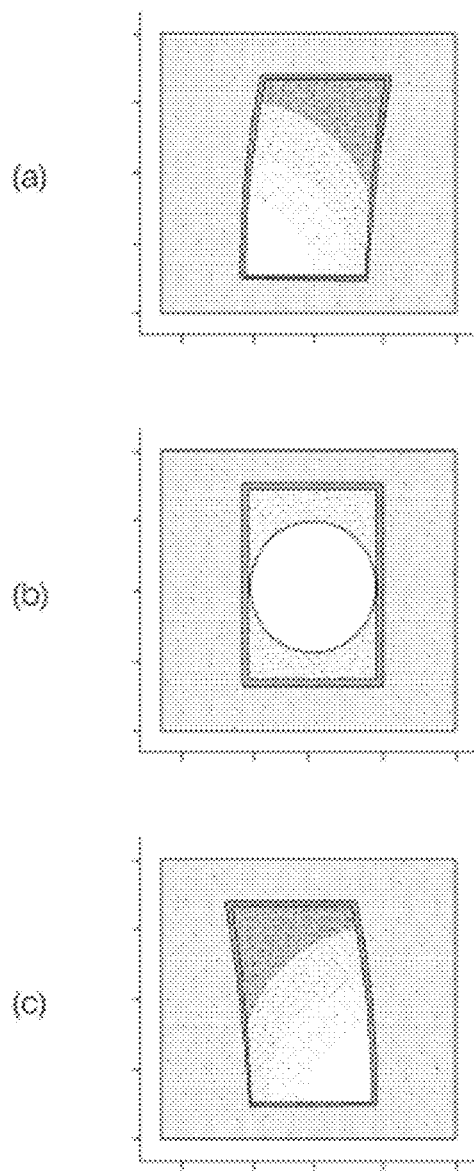

FIGS. 6 and 7 are views illustrating the conventional fly-eye lens and image formation on the DMD panel.

FIGS. 7(a), (b), (c) exemplarily illustrate light beams having passed through regions a, b, c of the fly-eye lens of FIG. 6. As viewed from the DMD panel 360, light beams having passed through the region b of the fly-eye lens accurately form an image of a rectangular shape.

However, light beams having passed through the regions a, c of the fly-eye lens form an image of a trapezoidal shape by light beams at the external angle due to a difference of optical paths between the TIR prism 350 and the fly-eye lens 330 and may thus lower overall uniformity.

Here, as a cell becomes distant from the center of the fly-eye lens, light beams having passed through the cell are incident upon the DMD panel 360 and form an image of a parallelogram shape and uniformity at the edge part is decreased. Further, loss in efficiency may be generated due to excessive margin setting. Further, a parallelogram or trapezoidal shape may be determined according to respective positions of the fly-eye lens 330.

Figure 8:
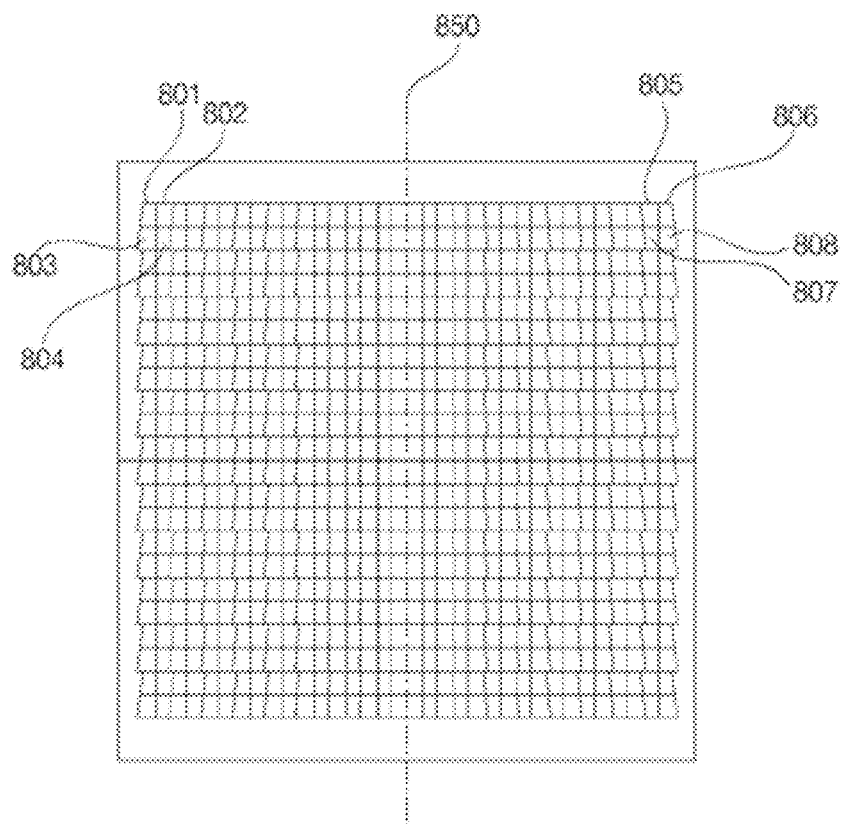
FIGS. 8 to 10 are views illustrating shapes of fly-eye lenses in accordance with embodiments of the present invention.
Figure 9:
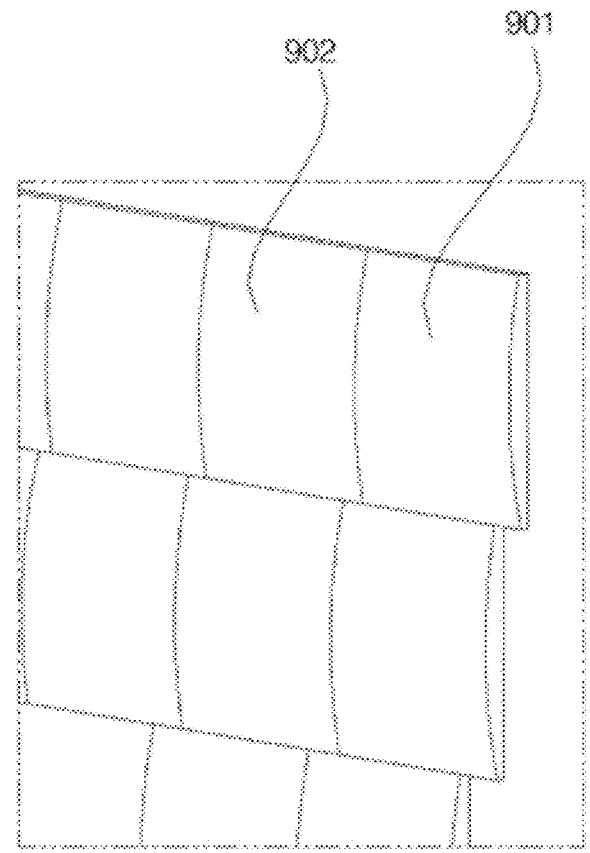
Figure 10:
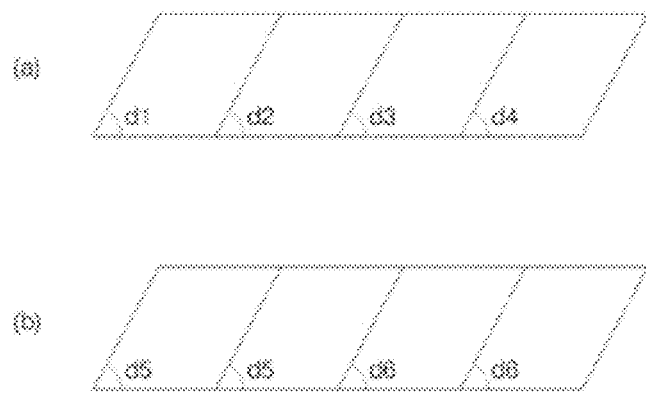

FIGS. 8 to 10 are views illustrating shapes of fly-eye lenses in accordance with embodiments of the present invention.

With reference to FIG. 8, a fly-eye lens 800 in accordance with one embodiment of the present invention includes a plurality of cells 801, 802, 803, 804, 805, 806, 807, 808, . . ., each of which includes a convex lens, and two or more of the cells have shapes different from shapes of other cells. With reference to the drawings, it may be confirmed that cells adjacent to a central line 850 of the fly-eye lens 800 have a rectangular shape and cells 801, 802, 803, 804, 805, 806, 807, 808 located at the left and right outermost regions distant from the central line 850 have shapes different from the rectangular shape, such as a trapezoidal shape, a parallelogram shape, etc., as viewed from the front.

Differently from the conventional fly-eye lens having cells with the same shape, the fly-eye lens 800 in accordance with one embodiment of the present invention may be configured such that respective cells have different shapes.

Among the cells, the two or more cells having shapes different from shapes of other cells may be cells located at the left and right outermost regions, and at least the cells located at the outermost regions may have shapes different from shapes of the cells adjacent to the central line 850 of the fly-eye lens 800.

Further, among the cells, cells located at the left and right outermost regions may have parallelogram shapes.

The cells of the fly-eye lens 800 in accordance with one embodiment of the present invention may have different parallelogram shapes according to the positions of the respective cells so as to achieve inverse compensation for the parallelogram shapes of formed images according to the respective cells, as exemplarily shown in FIG. 7.

In this case, among the cells, several cells 801, 802, 803, 804 or 805, 806, 807, 808 may be gathered to form a parallelogram shape, as viewed from the front.

Further, among the cells, the cell 801 located at the left outermost region and the cell 806 located at the right outermost region may be bilaterally symmetrical with respect to the central line 850 of the fly-eye lens, and other cells may be symmetrical to each other with respect to the central line 850 of the fly-eye lens.

Otherwise, at least one 901 or 902 of a plurality of cells may respectively have a parallelogram shape, as exemplarily shown in FIG. 9.

That is, the fly-eye lens in accordance with the present invention may be configured such that respective cells have shapes to execute inverse compensation for distortion and optical aberration of light beams incident upon the DMD and thus improve optical efficiency and uniformity.

Further, each of the cells of the fly-eye lens may include a convex lens. A concave lens tends to diverge light and is thus referred to as a diverging lens. On the other hand, a convex lens tends to converge light beams. The convex lens converges parallel light beams on one point using refraction of light. Here, the point on which the parallel light beams are converged is a focus, light beams incident upon a lens axis in parallel pass through the focus after refraction, and the light beams having passed through the focus travel in parallel with the lens axis after refraction. Further, light beams passing through the center of the lens travel unchanged. Therefore, the fly-eye lens includes cells, each of which includes such a convex lens, and arranges a plurality of convex lenses in a matrix, and thus, as light beams incident upon the respective cells are refracted and then travel, may equalize the light beams.

Further, the cells may have gradually different shapes in a direction from the central line to the outer region of the fly-eye lens. As the cells are located closer to the outer regions, shapes of the cells may gradually increasingly differ from a rectangular shape. As understood from comparison of internal angles of adjacent cells at the same position shown in FIG. 10($a$), the angles are increased in order of a1<a2<a3<a4 so that the corresponding cells gradually approach a rectangular shape.

Otherwise, the above-described cells are divided into three or more groups, and cells in each group may have the same shape which is different from the shapes of cells in other groups.

As understood from comparison of internal angles of adjacent cells at the same position shown in FIG. 10($b$), cells belonging to a first group have an internal angle a5, cells belonging to a second group have an internal angle a6, and the angle a6 is slightly greater than the angle a5 so that, as the cells approach the center of the fly-eye lens, the angles of the cells gradually increase and thus the cells gradually approach a rectangular shape.

The optical engine for a projector in accordance with one embodiment of the present invention described with reference to FIGS. 2 and 3 may include the above-described fly-eye lens.

Therefore, an optical engine for a projector in accordance with one embodiment of the present invention includes a first light source unit, a second light source unit to output light beams with a color different from that of the first light source unit, a third light source unit to output light beams with a color different from those of the first light source unit and the second light source unit, a micro display panel to output a predetermined image, a fly-eye lens including a plurality of cells, each of which includes a convex lens, to equalize light beams, and a projection lens to project a generated projection image to the outside based on the output light beams from the first to third light source units and the output image.

Further, among the cells, two or more cells having shapes different from shapes of other cells may be located at the left and right outermost regions.

In this case, among the cells, the cells located at the left and right outermost regions may have parallelogram shapes.

Further, among the cells, the shape of the cells located at the left outermost region and the shape of the cells located at the right outermost region may be bilaterally symmetrical with respect to the central line of the fly-eye lens.

Further, one or more cells may individually have a parallelogram shape, or two or more cells having shapes different from shapes of other cells may be gathered to form a parallelogram shape.

Further, the cells of the fly-eye lens may have gradually different shapes in a direction from the central line to the outer region of the fly-eye lens, or the cells of the fly-eye lens may be divided into three or more groups such that cells in each group may have the same shape which is different from the shapes of cells in other groups.

The optical engine in accordance with one embodiment of the preset invention may include two relay lenses disposed so as not to be parallel with each other. That is, in order to reduce a focal length difference to decrease distortion, one of the relay lenses may be tilted.

Figure 11:
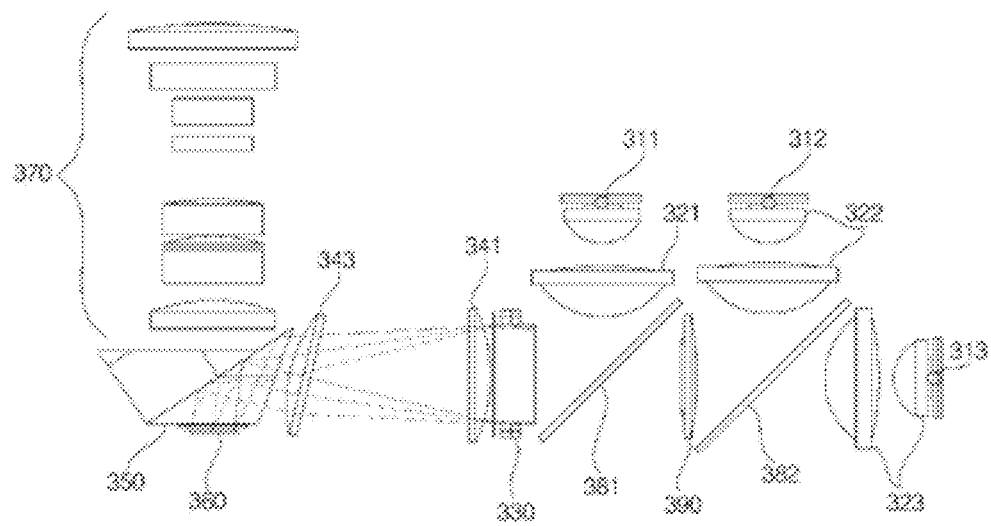
FIGS. 11 and 12 are reference views illustrating an optical engine in accordance with one embodiment of the present invention.
Figure 12:
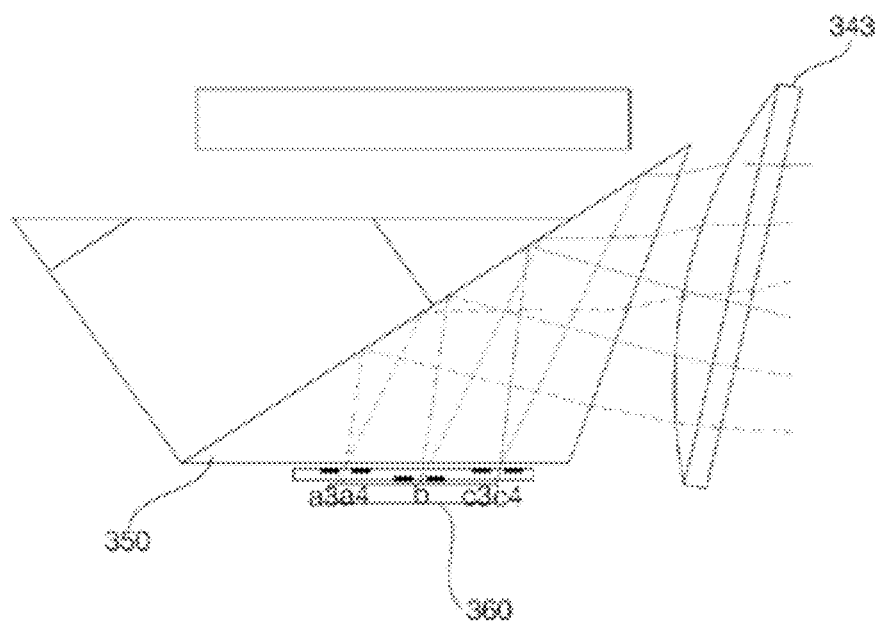

FIGS. 11 and 12 are reference views illustrating an optical engine in accordance with one embodiment of the present invention.

With reference to FIG. 11, an optical engine in accordance with one embodiment of the present invention includes first to third light source units 311, 312, 313 to output light beams with different colors, a micro display panel 360 to output a predetermined image, a fly-eye lens 330 to equalize light beams, and a projection lens 370 to project a generated projection image to the outside based on the output light beams from the first to third light source units 311, 312, 313 and the output image.

Further, as described above with reference to FIG. 3, the optical engine in accordance with one embodiment of the present invention may further include first to third collimator lenses 321, 322, 323, first and second mirrors 381, 382, a common lens 390, and a TIR prism 350.

A difference between the embodiment of FIG. 11 and the embodiment of FIG. 3 is that, among relay lens 341, 343 to collimate light beams having passed through the fly-eye lens 330 including cells having different shapes in accordance with this embodiment, the relay lens 343 adjacent to the TIR prism 350 is tilted so as not to be parallel with the other relay lens 341.

Through comparison of FIG. 12 to FIG. 4, among light beams having passed through the relay lens 343, light beams b having passed through the central region may precisely reach a focus and light beams a3, a4, c3, c4 having passed through the outer regions may reach the position of the focus of the DMD panel 360 due to reduction of an optical path difference.

In FIG. 12, a mark '-' indicates the positions of the focus according to positions of the respective cells.

The relay lenses 341, 343 may be convex lenses or plano-convex lenses.

In accordance with the present invention, the structure and components of a projector may be simplified and optical efficiency may be improved, thereby reducing manufacturing costs and an installation space and improving display quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An optical engine for a projector, comprising:
   a first light source unit;
   a second light source unit configured to output light beams with a color different from that of the first light source unit;
   a third light source unit configured to output light beams with a color different from those of the first light source unit and the second light source unit;
   a micro display panel configured to output a predetermined image;
   a fly-eye lens including a plurality of cells, each of which includes a convex lens, and configured to equalize light beams;
   a projection lens configured to project a generated projection image to the outside based on the output light beams from the first to third light source units and the output image;
   a first mirror configured to change the traveling direction of light beams from the first light source unit and to transmit light beams from the second light source unit and the third light source unit;
   a second mirror configured to change the traveling direction of light beams from the second light source unit and to transmit light beams from the third light source unit;
   a common lens disposed between the first mirror and the second mirror;
   relay lenses configured to collimate light beams having passed through the fly-eye lens, and a total internal reflection prism configured to output light beams to the projection lens;
   wherein, among the cells, two or more cells have shapes different from shapes of other cells.

2. The optical engine according to claim 1, wherein the two or more cells having shapes different from shapes of other cells are located at the left and right outermost regions, among the cells.

3. The optical engine according to claim 2, wherein, among the cells, the cells located at the left and right outermost regions have parallelogram shapes.

4. The optical engine according to claim 3, wherein, among the cells, the shape of the cells located at the left outermost region and the shape of the cells located at the right outermost region are bilaterally symmetrical with respect to the central line of the fly-eye lens.

5. The optical engine according to claim 1, wherein the two or more cells having shapes different from shapes of other cells are gathered to form a parallelogram shape.

6. The optical engine according to claim 1, wherein the fly-eye lens is configured such that the cells have gradually different shapes in a direction from the central line to the outer region of the fly-eye lens.

7. The optical engine according to claim 1, wherein the cells of the fly-eye lens are divided into three or more groups, and cells in each group have the same shape which is different from the shapes of cells in other groups.

8. The optical engine according to claim 1, further comprising first to third collimator lenses to convert light beams output from the first to third light source units into parallel light beams.

9. The optical engine according to claim 8, wherein the traveling direction of light beams having passed through the first collimator lens is parallel with light beams having passed through the second collimator lens.

10. The optical engine according to claim 8, wherein the traveling direction of light beams having passed through the first collimator lens is perpendicular to light beams having passed through the third collimator lens.

11. The optical engine according to claim 1, wherein the relay lenses include two lenses disposed so as not to be parallel with each other.

12. The optical engine according to claim 11, wherein the third light source unit, the fly-eye lens, the relay lenses and the projection lens are disposed in an L shape.

* * * * *